(12) United States Patent
Hahn et al.

(10) Patent No.: US 7,482,771 B2
(45) Date of Patent: Jan. 27, 2009

(54) METHOD FOR MONITORING A DRIVE DEVICE FOR A STANDSTILL CONDITION, MONITORING SYSTEM THEREFORE, AND DRIVE SYSTEM THEREFORE

(75) Inventors: Ulrich Hahn, Neustadt (DE); Günter Schwesig, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 96 days.

(21) Appl. No.: 11/577,425

(22) PCT Filed: Oct. 10, 2005

(86) PCT No.: PCT/EP2005/055127

§ 371 (c)(1),
(2), (4) Date: Apr. 18, 2007

(87) PCT Pub. No.: WO2006/042805

PCT Pub. Date: Apr. 27, 2006

(65) Prior Publication Data

US 2008/0088267 A1    Apr. 17, 2008

(30) Foreign Application Priority Data

Oct. 18, 2004    (DE) .................. 10 2004 050 647

(51) Int. Cl.
H02P 3/16    (2006.01)
(52) U.S. Cl. .................. 318/272; 318/599; 318/612; 187/247; 187/248; 187/224; 187/276; 187/209
(58) Field of Classification Search .............. 318/272, 318/599, 612; 187/247, 248, 224, 276, 209
See application file for complete search history.

(56) References Cited

U.S. PATENT DOCUMENTS

| | | | | |
|---|---|---|---|---|
| 4,664,247 A | * | 5/1987 | Wolf et al. ............... | 198/323 |
| 4,898,263 A | | 2/1990 | Manske et al. | |
| 5,083,634 A | * | 1/1992 | Yonemoto ................. | 187/277 |
| 5,402,863 A | * | 4/1995 | Okumura et al. .......... | 187/288 |
| 5,791,442 A | * | 8/1998 | Arnold .................... | 188/138 |

(Continued)

FOREIGN PATENT DOCUMENTS

DE    297 18 288 U1    1/1996

(Continued)

*Primary Examiner*—Rita Leykin
(74) *Attorney, Agent, or Firm*—Henry M. Feiereisen; Ursula B. Day

(57) ABSTRACT

In a method for monitoring a stationary condition of a drive device, a monitoring device provides the drive device with a temporally varying monitoring signal which, when a sensor device connected to the drive device functions properly, modulates a sensor output signal of the sensor device in accordance with the monitoring input signal. The monitoring device receives the sensor signal and monitors it for the presence of a corresponding signal component. In the absence of such a signal component, the monitoring device controls a safety device which converts the drive device into a safe state. When the drive device is controlled by means of at least two phase-shifted current regulators, it is possible for the monitoring device to monitor an output signal of at least one of the current regulators for constancy and to control the safety device when the output signal of the at least one current regulator changes.

17 Claims, 3 Drawing Sheets

U.S. PATENT DOCUMENTS

| | | |
|---|---|---|
| 6,091,219 A | 7/2000 | Maruo et al. |
| 6,283,252 B1 * | 9/2001 | Lee .............................. 187/291 |
| 6,315,081 B1 * | 11/2001 | Yeo ............................. 187/290 |
| 6,351,096 B1 * | 2/2002 | Jang ............................ 318/811 |
| 6,409,117 B2 * | 6/2002 | Petersen et al. .......... 242/485.6 |
| 6,878,096 B1 * | 4/2005 | Winner et al. ................. 477/94 |
| 7,031,818 B2 * | 4/2006 | Endres ........................ 701/70 |

FOREIGN PATENT DOCUMENTS

| | | |
|---|---|---|
| JP | 59 072515 | 4/1984 |
| JP | 07 206295 | 8/1995 |
| JP | 09 110323 | 4/1997 |
| JP | 2002 068619 | 3/2002 |

* cited by examiner

METHOD FOR MONITORING A DRIVE DEVICE FOR A STANDSTILL CONDITION, MONITORING SYSTEM THEREFORE, AND DRIVE SYSTEM THEREFORE

BACKGROUND OF THE INVENTION

The present invention relates to a method for monitoring a drive device for a standstill condition.

There are machine parts (for example an inclined bed in the case of a rotary machine or a lift cage in the case of normal conveying equipment) which are driven by means of conventional electrical drive devices and in which the state "suspended load" can occur. That is to say there is a state in which a minimum torque needs to be applied by the drive in order to counteract the force of gravity, which pulls the load downwards.

In the event of failure of or another fault in the electrical drive device, said electrical drive device cannot apply the required torque. If no further measures were to be taken, the lift cage could fall down, for example, and people and objects may be endangered.

In order to provide protection against such risks, safety devices are known, for example releasable brakes, which engage in the event of a fault and in the event of failure of the power supply and transfer the suspended load into a safe state. In order to detect such faults, when at a standstill multi-channel, redundant safety systems and components are used which cause one or more safety devices to be triggered.

The transfer into the safe state can naturally only be brought about when a fault which has occurred is also detected. Depending on the embodiment and the application case, the fault in this case needs to be detected correspondingly rapidly.

There are faults which cannot be detected immediately or for the detection of which complex additional measures are required such as a redundant design of sensor devices, for example. Examples of such faults are firstly breakage of the sensor shaft, i.e. the connection between the drive device and a sensor device, which connection is fixed against rotation, which sensor shaft detects an actual position or an actual rotation speed of the drive device, and faulty operations in the sensor system itself, which bring about apparently correct signals. Such faults cannot be detected in the case of a single-channel sensor device, i.e. in the case of a non-redundant sensor device.

In order to detect such faults, it is naturally possible to provide a second sensor device, i.e. to design the sensor device to be redundant. However, this is firstly associated with corresponding costs, and secondly a corresponding amount of installation space is required for this purpose which is not always available. If, for whatever reasons, a second, redundant sensor device is not provided, it has often simply been assumed in the prior art that, during running operation of the drive device, the state "suspended load" always only occurs for a very short period of time, i.e. the risk of breakage of the sensor shaft and faulty functioning of the sensor device itself during such a standstill time of the drive device can be accepted.

SUMMARY OF THE INVENTION

The object of the present invention consists in providing a method for monitoring a drive device for a standstill condition and corresponding devices, by means of which the above-mentioned faults can also reliably be detected, although the sensor device is only provided with a single-channel configuration and although only signals are evaluated which are required in any case for controlling the drive device during normal operation thereof.

The object is first achieved by a method for monitoring a drive device for a standstill condition, in which a monitoring device applies a monitoring input signal, which changes over time, to the drive device, on the basis of which monitoring input signal, when a sensor device, which is connected to the drive device, is functioning correctly, a sensor output signal of the sensor device is modulated corresponding to the monitoring input signal, the monitoring device receives the sensor output signal, the monitoring device monitors the sensor output signal for the presence of a signal component which corresponds to the monitoring input signal, and the monitoring device, in the event of the absence of the signal component corresponding to the monitoring input signal, drives a safety device, which in this case transfers the drive device into a safe state.

The problem that the abovementioned sensor faults cannot be detected only occurs if there is the state "suspended load", i.e. the drive device is not being run. It is therefore sufficient if the monitoring device only implements the monitoring method when the drive device is not being run, with the exception of a movement brought about by the monitoring input signal. In individual cases, it may even be sufficient if the monitoring device only implements the monitoring method when the drive device has not been run over a time span which is greater than a wait time.

The drive device is generally controlled by means of a controller. In this case, the monitoring device can impress the monitoring input signal alternatively onto an input signal of the controller or onto an output signal of the controller.

If the monitoring input signal is impressed onto an output signal of the controller, the monitoring input signal may be determined such that, despite the movement of the drive device brought about by the monitoring input signal, it is without influence on the output signal, which is output by the controller, as such.

The controller can alternatively control the position or the speed or the rotation speed of the drive device. If the drive device is in the form of an electrical drive device, the controller can also control the current flowing through the drive device.

If the electrical drive device is driven by means of at least two current controllers, which operate in a manner in which they are phase-shifted with respect to one another, the object is also achieved by a monitoring method in which a monitoring device monitors an output signal of at least one of the current controllers for constancy and, in the event of a change in the output signal of the at least one current controller, drives a safety device, which in this case transfers the drive device into a safe state.

In this case, too, it is possible for the monitoring device only to implement the monitoring method when the drive device is not being run or when the drive device has not been run over a time span which is greater than the wait time.

The object is furthermore also achieved by a monitoring device for carrying out such monitoring methods.

Finally, the object is also achieved by a drive system for a movable element, in particular a suspended load, which has a drive unit for moving the movable element, a single sensor device for detecting an actual position of the drive device, a safety device for transferring the drive device into a safe state and a monitoring device of the above described type.

BRIEF DESCRIPTION OF THE DRAWING

Further advantages and details result from the description below relating to exemplary embodiments in conjunction with the drawings, in which, as basic illustrations.

DETAILED DESCRIPTION OF PREFERRED EMBODIMENTS

Figure 1:
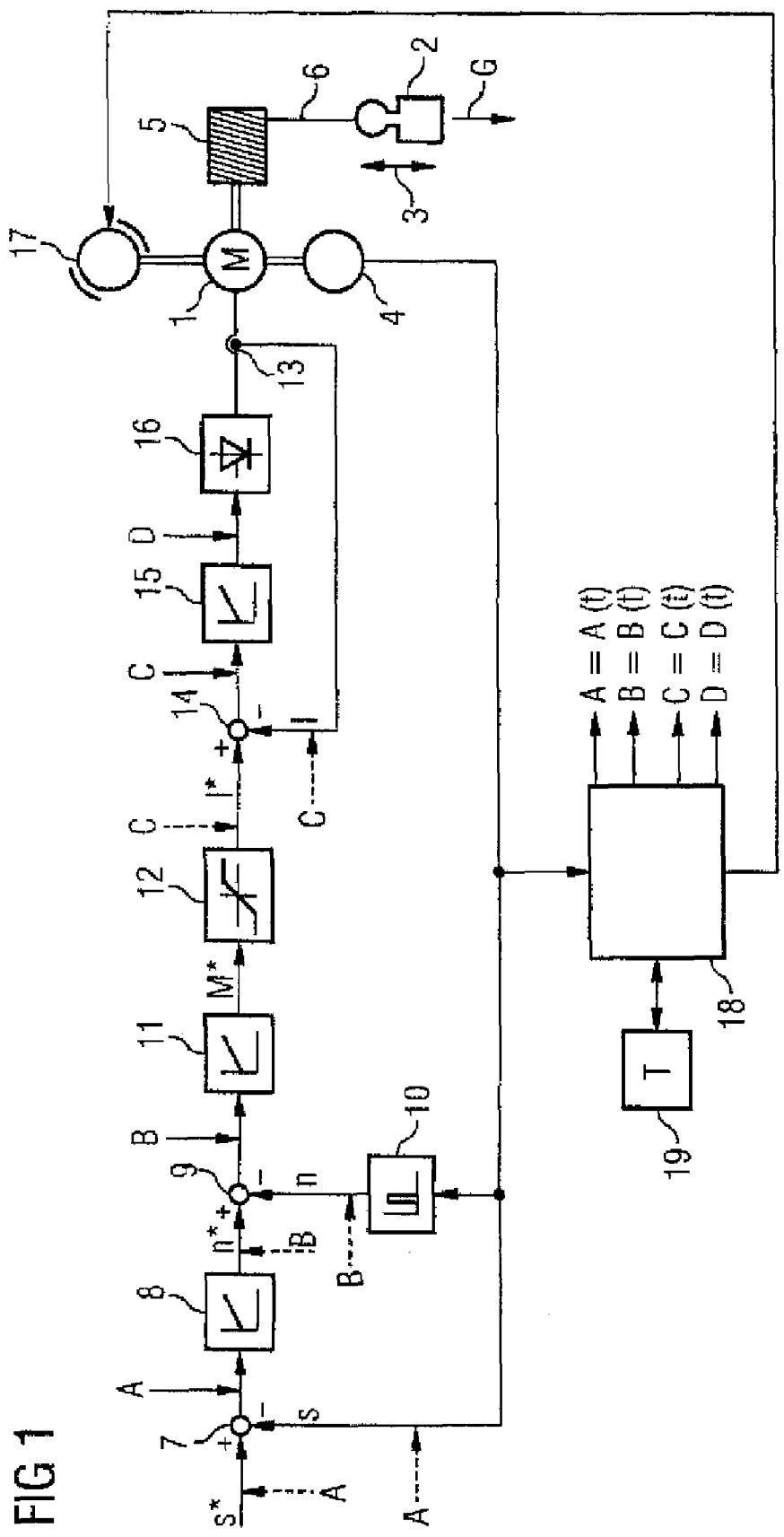
FIG. 1 shows a block circuit diagram of a drive system according to the invention.

As shown in FIG. 1, a drive system has a drive device 1. In this case, the drive device 1 is preferably in the form of an electrical drive device 1. It is used for moving a movable element 2. This is indicated in FIG. 1 by an arrow 3. The movable element 2 can in this case in particular be in the form of a load 2, which can be moved against the force of gravity and exerts a force due to weight G on the drive device 1. This is illustrated in FIG. 1 by the configuration of the movable element 2 as a schematically indicated weight.

Furthermore, the drive system has a sensor device 4. The sensor device 4 in the context of the drive system according to the invention is preferably the only sensor device 4 provided. In its correct state it is connected to the drive device 1 such that it is fixed against rotation.

By means of the sensor device 4, an actual position s of the drive device 1 is detected, and a corresponding sensor output signal is output. Alternatively, given a corresponding configuration of the drive system, the sensor device 4 could also detect an actual rotation speed n or an actual speed of the drive device 1. Owing to a connection between the drive device 1 and a cable drum 5, which connection is fixed against rotation, and a force-fitting connection between the cable drum 5 and the load 2, via a suspension cable 6, the actual position s of the drive device 1 at the same time also corresponds to an actual position of the movable element 2.

In the normal case, the drive system functions as follows:

The sensor output signal s and a desired position s* of the drive device I are supplied to a position controller 8 via a first node point 7, which forms the difference between the desired position s* and the actual position s. The position controller 8 determines a desired rotation speed n* for the drive device 1 on the basis of the differential signal supplied to it. This desired rotation speed n* is supplied to a second node point 9.

The sensor output signal s is furthermore supplied to a differentiating element 10, which determines, on the basis of the sensor output signal s, the time derivative of said signal, which time derivative corresponds to the actual rotation speed n of the drive device 1. The actual rotation speed n is also supplied to the second node point 9.

In the second node point 9, the difference between the desired rotation speed n* and the actual rotation speed n is formed and supplied from there to a rotation speed controller 11. The rotation speed controller 11 determines a desired torque M*, which it outputs to a limiter 12. The output signal I* of the limiter 12 corresponds to a desired current I* for the drive device 1.

By means of a current detection device 13, an actual current I, which flows through the drive device 1, is furthermore detected. Both the desired current I* and the actual current I are supplied to a third node point 14, in which the difference between these two variables I*, I is formed. This difference is supplied to a current controller 15, which correspondingly adjusts a downstream power controller 16 of the drive device 1.

The torque applied by the drive device 1 in the majority of operating states is greater than or less than the force due to weight G of the load 2, or else the load 2 is held by a safety device 17, for example a brake 17. In the latter case, the drive device 1 naturally does not apply any torque. In the individual case, however, it is also possible for the safety device 17 not to be in engagement (i.e. for example, the brake 17 is released) and the torque applied by the drive device 1 precisely compensates for the force due to weight G of the element 2. If, in this operating state (="suspended load"), faulty functioning of the sensor device 4 occurs, uncontrolled lifting, lowering or, in an extreme case, even crashing down of the load 2 results. Such a faulty functioning therefore needs to be identified in good time.

In order to detect such faulty functioning, i.e. in order to monitor the sensor device 4 for correct functioning, the drive system has a monitoring device 18. By means of this monitoring device 18, it is therefore possible to also indirectly monitor the drive device 1 for a standstill condition. The monitoring device 18 implements a monitoring method which will be described in more detail below in conjunction with FIGS. 1 and 2.

Figure 2:
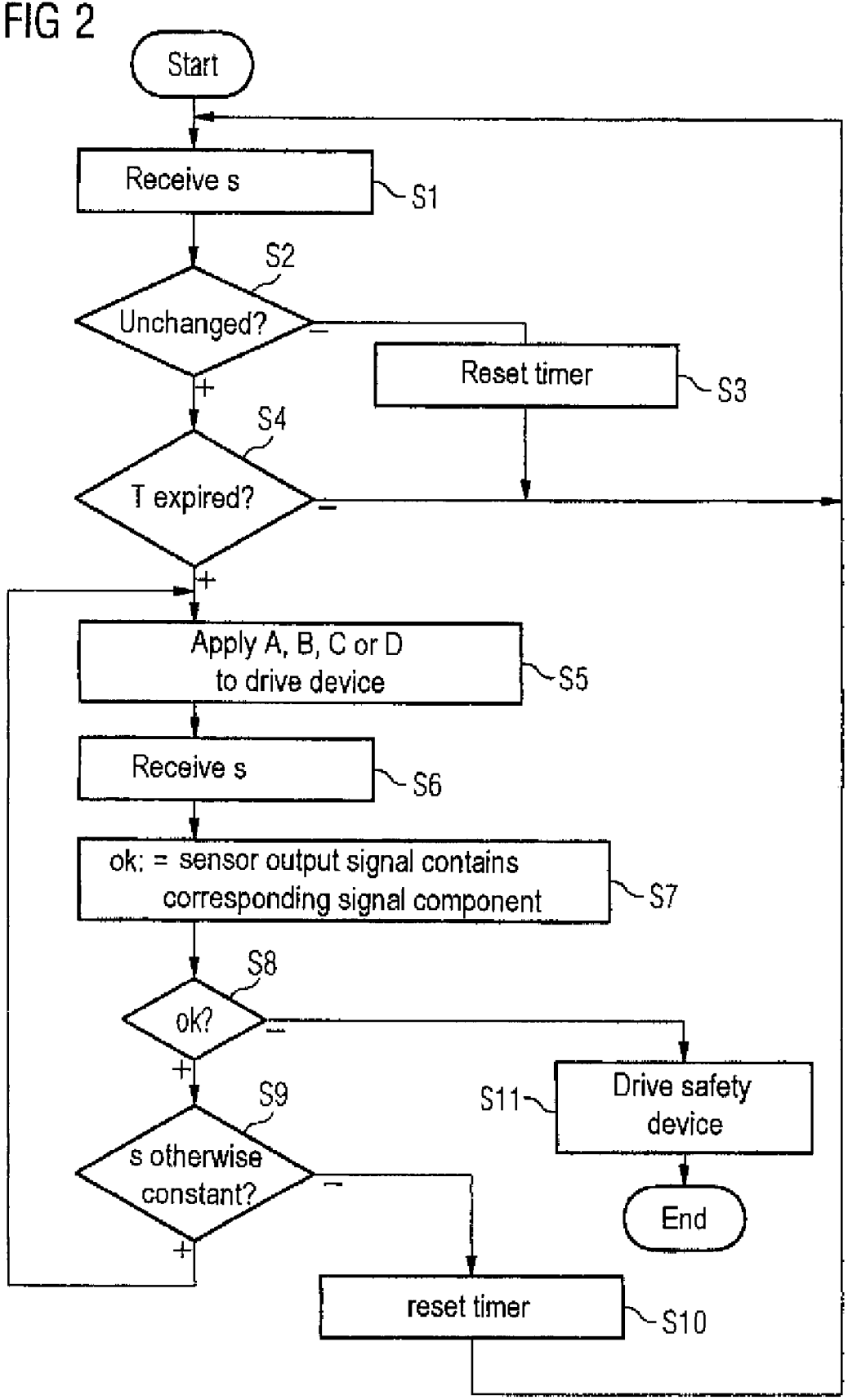
FIG. 2 shows, in the form of a flow chart, a monitoring method according to the invention.

As shown in FIG. 2, the monitoring device 18, in a step S1, first receives the sensor output signal s. By comparing this with a sensor output signal s which has been determined immediately prior to this, the monitoring device 18 is therefore capable of checking, in a subsequent step S2, whether the actual position s has remained constant. If this is not the case, a timer 19 is reset in a step S3 and the method returns to step S1.

If the actual position s has remained unchanged, the method is transferred to step S4, in which a check is carried out to ascertain whether the timer 19 has expired, i.e. a wait time T has elapsed. If this is not the case, the method returns to step S1 again, otherwise a step S5 is implemented.

If the step S5 is started, the drive device 1 has not been run over a time span which is greater than the wait time T. In this step S5 a monitoring input signal A to D is therefore applied to the drive device 1 by the monitoring device 18. The monitoring input signal A to D in this case changes over time. In this case, only one of the monitoring input signals A to D is output.

The monitoring input signal A is a position signal. It is impressed onto the input signal of the position controller 8 upstream of said position controller 8. Alternatively, it could also be impressed onto the actual position s or the desired position s*, as illustrated by dashed lines in FIG. 1.

The monitoring input signal B is a rotation speed signal. It is impressed onto the input signal of the rotation speed controller 11 upstream of said rotation speed controller 11. Alternatively, it could also be impressed onto the output signal of the position controller 8 or onto the output signal of the differentiating element 10, as illustrated by dashed lines in FIG. 1.

The monitoring input signal C is a current signal. It is impressed onto the input signal of the current controller 15 upstream of said current controller 15. Alternatively, it could also be impressed onto the desired current I* or the actual current I, as illustrated by dashed lines in FIG. 1.

The monitoring input signal D is a control signal for the power controller 16. It is impressed onto the output signal of the current controller 15 downstream of said current controller 15.

Owing to one of the monitoring input signals A to D, which change over time, being impressed, this monitoring input signal A to D is applied to the drive device 1. As a result, assuming correct functioning of the sensor device 4, the sensor output signal s is modulated corresponding to the monitoring input signal A to D used. The monitoring device 18 is therefore capable of monitoring the sensor output signal s for the presence of a signal component which corresponds to the impressed monitoring input signal A to D. If the corresponding signal component is present, the sensor device 4 is functioning correctly. Otherwise, there is a fault in its functioning.

The monitoring device 18 therefore again receives the sensor output signal s in a step S6. In steps S7 and S8, it carries out a check to ascertain whether the sensor output signal s contains the corresponding signal component. For example, a Fourier analysis of the sensor output signal s can be carried out for this purpose in terms of a specific frequency.

If the sensor output signal s contains the corresponding signal component, the monitoring device 18 checks, in a step S9, whether, with the exception of the modulation by the monitoring input signal A to D, the sensor output signal s has otherwise remained constant. If this is the case, it returns to step S5. Otherwise, it resets the timer 19 in a step S10 and returns to step S1 again.

If the corresponding signal component was not present in steps S7 and S8, a fault has occurred in the sensor device 4. In this case, the monitoring device 18 branches off from step S8 to a step S11. In step S11, the monitoring device 18 drives the safety device 17 such that it transfers the drive device 1 into a safe state.

The monitoring input signal A to D naturally needs to be determined such that the sensor output signal s is modulated correspondingly. In principle, the monitoring input signal A to D, via the roundabout route of the sensor output signal s, can therefore affect both the position controller 8 and the rotation speed controller 11 and the current controller 15. If, however, for example, the monitoring input signal B is impressed onto the input signal of the rotation speed controller 11, the monitoring input signal B can, under certain circumstances, be determined such that the impressed monitoring input signal, in this case the monitoring input signal B, does not have any influence on controllers, in this case the position controller 8, which are upstream of the impression point. This is because the individual controllers 8, 11 and 15 do not necessarily have the same frequency and integration response. If, for example, the position controller 8 has a long integration time and a relatively poor frequency response, but the rotation speed controller 11 and the current controller 15 have short integration times and a good frequency response, the frequency of the monitoring input signal B used can be selected such that, although it is below the limit frequency of the rotation speed controller 11 and the current controller 15, it is above the limit frequency of the position controller 8. Also, the amplitude can possibly be selected to be so low that, although there are effects on the sensor output signal s, owing to the integration response of the position controller 8 the effects are not noticeable in the output signal n* of the position controller 8 as such.

In the monitoring methods described above in conjunction with, in particular, FIG. 2, applying the monitoring input signal A to D, which changes over time, to the drive device 1 in addition to subsequent evaluation of the sensor output signal s, i.e. implementation of steps S5 to S11, only takes place when the drive device 1 has not been run over a time span which is greater than the wait time T. In this case, the wait time T is determined by the timer 19. It is generally in the range of between one second and one minute. Usually, it is within the one-digit seconds range. However, it is also possible for steps S3, S4 and S10 to be dispensed with. In this case, too, the monitoring device 18 only implements the monitoring method of steps S5 to S11 when the drive device 1 is not being run, with the exception of the movement brought about by the monitoring input signal A to D. In this case, however, implementation of the monitoring method is begun immediately, as soon as the drive device 1 has come to a standstill.

It is even possible for steps S2 and S9 to also be dispensed with, in addition to steps S3, S4 and S10. In this case, the monitoring method is always implemented.

Figure 3:
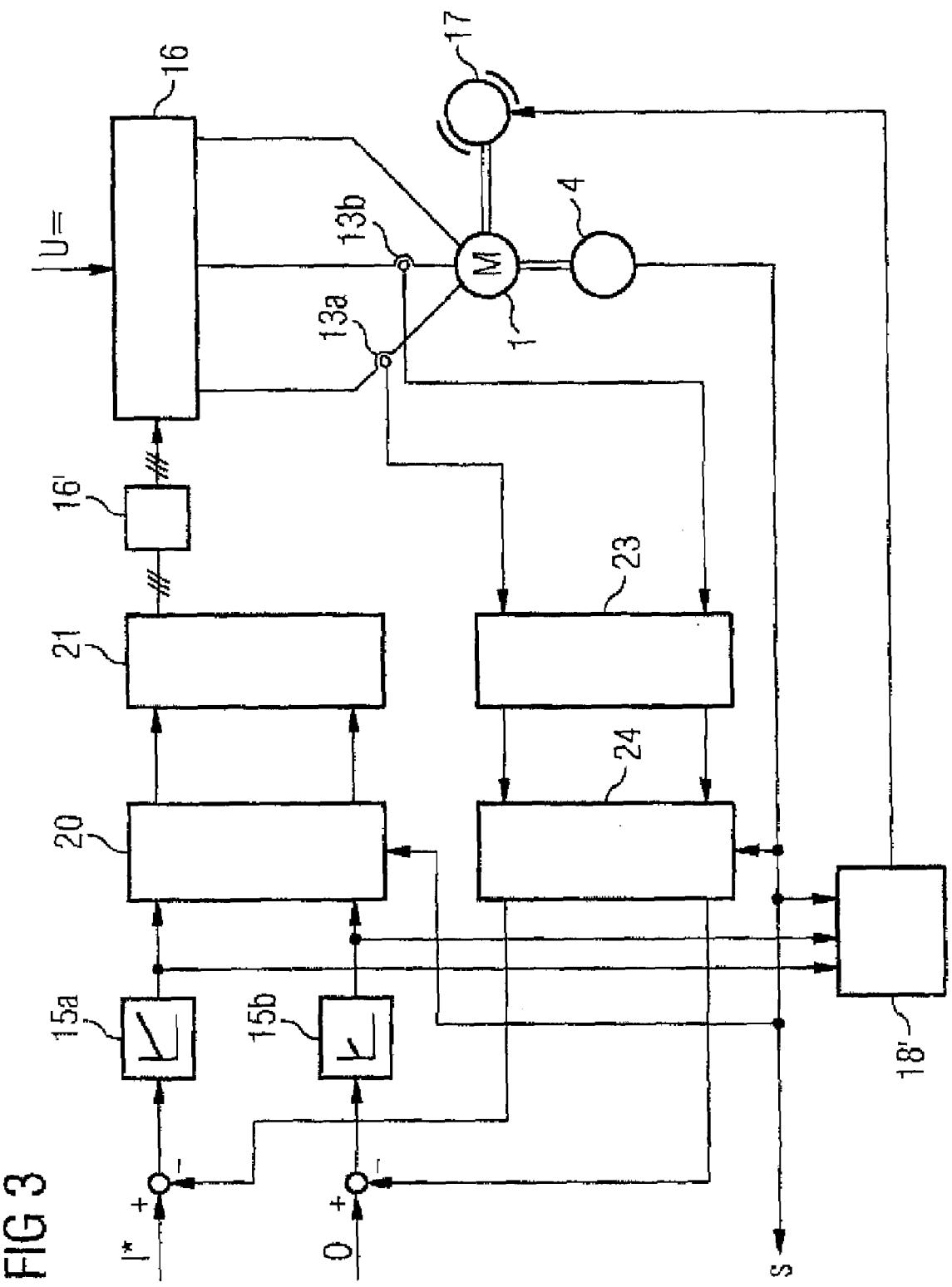
FIG. 3 shows a section from FIG. 1 in a detailed, developed illustration.

In addition to the methods described above, there is a further option for detecting a standstill condition of the drive device 1. However, this option can only be applied in an electrical drive device 1 which is driven by means of at least two current controllers 15a, 15b which operate in a manner in which they are phase-shifted with respect to one another. One example of such an electrical drive device 1 and its drive system is illustrated in FIG. 3. The illustration in FIG. 3 in this case corresponds to a possible specific configuration of the current controller 8 and of the power controller 16 in FIG. 1.

As shown in FIG. 3, precisely two current controllers 15a, 15b are provided. In general, the current controllers 15a, 15b function with a 90° phase shift. Their output signals are supplied to a first coordinate converter 21 via a first vector rotator 20. The first coordinate converter 21 converts the output signals of the current controllers 15a, 15b into phase voltage desired values. These phase voltage desired values are then output to triggering equipment 16', which for its part drives circuit breakers of the downstream inverter 16 correspondingly.

As shown in FIG. 3, at least two of the phase current actual values are detected by means of corresponding current detection devices 13a, 13b and supply to a second vector rotator 24 via a second coordinate converter 23. The second coordinate converter 23 and the second vector rotator 24 convert the detected phase current actual values in a manner known per se into corresponding current actual values related to the current controllers 15a, 15b.

The output signals of the current controllers 15a, 15b are again supplied to a monitoring device 18'. This is naturally not identical to the monitoring device 18 in FIG. 1, but serves the same purpose. It carries out a check to ascertain whether, in the event of the drive device 1 being at a standstill, i.e. in the event of a constant sensor output signal s, the output signals of the current controllers 15a, 15b remain constant. This is because only then is the electrical drive device 1 actually at a standstill. If, on the other hand, at least one of the two output signals changes, the drive device 1 is not at a standstill. In this case, the monitoring device 18' drives the safety device 17, which in this case transfers the drive device 1 into a safe state. The safety device 17 from FIG. 3 can in this case be identical to the safety device 17 from FIG. 1.

In principle, it is sufficient if the monitoring device 18' is only supplied a single one of the output signals of the current controllers 15a, 15b. If, however, the supplied output signal coincidentally assumes precisely a maximum as the absolute value, the method is very insensitive to changes in position of the drive device 1. An undesired movement of the drive device 1 is therefore only detected relatively late. Preferably both output signals are therefore supplied to the monitoring device 18. This is because, owing to the phase shift of 90°, if one output signal is at a maximum in terms of absolute value, the other signal is in the vicinity of its zero crossing. In the region of the zero crossing, the output signals have their greatest sensitivity to a change in position of the drive device 1, however.

The monitoring method described above in conjunction with FIG. 3, as is likewise the case with the monitoring method in conjunction with FIGS. 1 and 2, can alternatively be carried out immediately as the standstill condition of the drive device 1 is reached or only once the wait time T mentioned in conjunction with FIGS. 1 and 2 has expired.

By means of the configurations according to the invention, detection of faulty functioning of the sensor device 4 is therefore also easily possible when neither a further sensor device is provided nor other additional signals are detected.

What is claimed is:

1. A method for monitoring a drive device, comprising the steps of:
   providing a monitoring device to apply a monitoring input signal, which changes over time, to a drive device at a standstill;
   modulating commensurate with the monitoring input signal a sensor output signal of a sensor device, which is connected to the drive device, in response to the monitoring input signal, when the sensor device functions properly;
   wherein the monitoring device receives the sensor output signal;
   wherein the monitoring device monitors the sensor output signal for the presence of a signal component which corresponds to the monitoring input signal; and
   wherein the monitoring device activates a safety device to transfer the drive device into a safe state, when the monitoring device ascertains the absence of the signal component corresponding to the monitoring input signal.

2. The monitoring method of claim 1, wherein the monitoring device executes the monitoring method only when the drive device is not in motion, with the exception of a movement caused by the monitoring input signal.

3. The monitoring method of claim 1, wherein the monitoring device executes the monitoring method only when the drive device has not been moved over a time span which is greater than a wait time.

4. The monitoring method of claim 1, wherein the drive device is controlled by means of a controller.

5. The monitoring method of claim 4, wherein the monitoring device impresses the monitoring input signal onto an input signal of the controller.

6. The monitoring method of claim 4, wherein the monitoring device impresses the monitoring input signal onto an output signal of the controller.

7. The monitoring method of claim 6, wherein the monitoring input signal is determined without influencing the output signal outputted by the controller, even though the monitoring input signal has triggered a movement of the drive device.

8. The monitoring method of claim 4, wherein the controller controls a position of the drive device.

9. The monitoring method of claim 4, wherein the controller controls a speed or rotation speed of the drive device.

10. The monitoring method of claim 4, wherein the drive device is constructed in the form of an electrical drive device, with the controller controlling a current flowing through the drive device.

11. A method for monitoring an electrical drive device, which is activated by at least two current controllers operating phase-shifted with respect to one another, comprising the steps of:
   providing a monitoring device to monitor at a standstill of the drive device an output signal of at least one of the current controllers for constancy; and
   activating a safety device in the event of a change in the output signal of the at least one current controller, to transfer the drive device into a safe state.

12. The monitoring method of claim 1, wherein the monitoring device executes the monitoring method only when the drive device is not in motion.

13. The monitoring method of claim 1, wherein the monitoring device executes the monitoring method only when the drive device has not been moved over a time span which is greater than a wait time.

14. A monitoring system for monitoring a drive device, comprising:
   a monitoring device applying a monitoring input signal, which changes over time, to a drive device at a standstill; and
   a sensor device operatively connected to the drive device and producing a sensor output signal which is modulated commensurate with the monitoring input signal in response to the monitoring input signal, when the sensor device functions properly,
   wherein the monitoring device receives the sensor output signal,
   wherein the monitoring device monitors the sensor output signal for the presence of a signal component which corresponds to the monitoring input signal, and
   wherein the monitoring device activates a safety device to transfer the drive device into a safe state, when the monitoring device ascertains the absence of the signal component corresponding to the monitoring input signal.

15. A monitoring system for monitoring an electrical drive device, which is activated by at least two current controllers operating phase-shifted with respect to one another, comprising a monitoring device monitoring an output signal of at least one of the current controllers for constancy, when the drive device is at a standstill, wherein the monitoring device activates a safety device in the event of a change in the output signal of the at least one current controller, to transfer the drive device into a safe state.

16. A drive system for a movable element, comprising:
   a drive device for moving the movable element;
   a single sensor device for detecting one parameter of the drive device selected from the group consisting of actual position of the drive device, actual rotation speed of the drive device, and actual speed of the drive device;
   a safety device for transferring the drive device into a safe state; and
   a monitoring device applying a monitoring input signal, which changes over time, to the drive device at a standstill,
   wherein the monitoring device receives a sensor output signal form the sensor device which is modulated commensurate with the monitoring input signal in response to the monitoring input signal, when the sensor device functions properly,
   wherein the monitoring device monitors the sensor output signal for the presence of a signal component which corresponds to the monitoring input signal, and
   wherein the monitoring device activates the safety device to transfer the drive device into the safe state, when the monitoring device ascertains the absence of the signal component corresponding to the monitoring input signal.

17. A drive system for a movable element, comprising:

an electrical drive device for moving the movable element, said drive device being activated by at least two current controllers operating phase-shifted with respect to one another;

a single sensor device for detecting one parameter of the drive device selected from the group consisting of actual position of the drive device, actual rotation speed of the drive device, and actual speed of the drive device;

a safety device for transferring the drive device into a safe state; and a monitoring device monitoring an output signal of at least one of the current controllers for constancy, when the drive device is at a standstill, wherein the monitoring device activates the safety device in the event of a change in the output signal of the at least one current controller, to transfer the drive device into the safe state.

* * * * *